United States Patent [19]
Oka et al.

[11] Patent Number: 4,467,074
[45] Date of Patent: Aug. 21, 1984

[54] FLUOROELASTOMER COMPOSITION

[75] Inventors: Masahiko Oka, Otsu; Hideo Kano, Settsu; Yutaka Ueta, Toyonaka, all of Japan

[73] Assignee: Daikin Kogyo Company, Limited, Osaka, Japan

[21] Appl. No.: 409,084

[22] Filed: Aug. 18, 1982

[30] Foreign Application Priority Data

Aug. 28, 1981 [JP] Japan ............................... 56-135908

[51] Int. Cl.³ .............................................. C08F 8/30
[52] U.S. Cl. ................................... 525/356; 525/326.3
[58] Field of Search ............................. 525/356, 326.3

[56] References Cited

U.S. PATENT DOCUMENTS 2,494,563 1/1950 Kirk, Jr. et al. ..................... 564/451
2,606,927 8/1952 Burkdoll et al. ..................... 564/451
3,344,175 9/1967 Canfield ............................ 525/326.3
3,761,454 9/1973 Geri et al. .

FOREIGN PATENT DOCUMENTS 52-78951 7/1977 Japan .

Primary Examiner—Joseph L. Schofer
Assistant Examiner—Bernard Lipman
Attorney, Agent, or Firm—Armstrong, Nikaido, Marmelstein & Kubovcik

[57] ABSTRACT

A fluoroelastomer composition comprising a fluoroelastomer, an acid acceptor and a hydrofluoric acid salt of 4,4'-alkylenebis(cyclohexylamine) as a curing agent, which has an excellent scorching resistance and an excellent curing reactivity.

4 Claims, No Drawings

FLUOROELASTOMER COMPOSITION

BACKGROUND OF THE INVENTION

The present invention relates to a composition containing a fluoroelastomer such as vinylidene fluoride-hexafluoropropene copolymers or vinylidene fluoride-hexafluoropropene-tetrafluoroethylene terpolymers, and more particularly to a fluoroelastomer composition having an excellent scorching resistance, namely excellent processability and storage stability, and moreover having an excellent curability.

It is known that fluoroelastomers such as vinylidene fluoride-hexafluoropropene copolymers and vinylidene fluoride-hexafluoropropene-tetrafluoroethylene terpolymers can be cured, for instance, with a polyamine, as reported in Industrial and Engineering Chemistry, Vol. 49, 1687(1957). However, the polyamine has the drawback that it causes scorching during milling or molding processing.

In order to solve the problem on scorching, a study of a curing agent has been made. It is made clear at present that a carbamate compound such as hexamethylenediamine carbamate as disclosed in Rubber World, Vol. 37, 250(1957) or 4,4'-methylenebis(cyclohexylamine) carbamate as disclosed in Rubber Chemistry & Technology, Vol. 46, 619(1973) and a Schiff base such as N,N'-dicinnamylidene-1,6-hexamethylenediamine as disclosed in British Pat. No. 838,281 provide a fluoroelastomer composition having a scorching resistance. However, in case of hexamethylenediamine carbamate and 4,4'-methylenebis(cyclohexylamine) carbamate, the scorching resistance is still insufficient, and they have the drawbacks that curing takes place at the time of molding processing and consequently the mold flow is hindered in an early stage. On the other hand, in case of the Schiff bases such as N,N'-dicinnamylidene-1,6-hexamethylenediamine, curing at high temperatures is necessary, since the curing reactivity is low as compared with the carbamate curing agents, though the scorching resistance is sufficient. Moreover, the cured rubber has a high compression set. Also, N,N'-dicinnamylidene-1,6-hexamethylenediamine has a peculiar smell and gives out a foul smell at the time of roll milling or curing. Further, in case of using this curing agent, a tarry volatile material is produced in a cured rubber and it causes the cured rubber to stick a mold, so the surface gloss of the cured rubber is decreased with staining of the mold.

It is proposed in Japanese Unexamined Patent Publication (Tokkyo Kokai) No. 78951/1977 to employ a curing agent such as hydrofluoric acid salt of hexamethylenediamine in order to eliminate the abovementioned drawbacks of the carbamate curing agent and the Schiff base curing agent, namely to provide a fluoroelastomer composition having a sufficient scorching resistance and an improved curability. The fluoroelastomer composition containing the proposed curing agent has a good scorching resistance as compared with the use of the above-mentioned carbamate curing agent, but is still insufficient in the scorching resistance in the storage under severe circumstances, e.g. at high temperature and high humidity.

It is a primary object of the present invention to provide a fluoroelastomer composition having a sufficient scorching resistance and an excellent curing reactivity.

This and other objects of the present invention will become apparent from the description hereinafter.

SUMMARY OF THE INVENTION

It has now been found that a particular hydrofluoric acid salt of 4,4'-alkylenebis(cyclohexylamine) can provide a fluoroelastomer composition having a sufficient scorching resistance and an excellent curing reactivity.

In accordance with the present invention, there is provided a fluoroelastomer composition comprising a fluoroelastomer, an acid acceptor and a curing agent, which is improved in that the curing agent is a hydrofluoric acid salt of a diamine compound of the general formula:

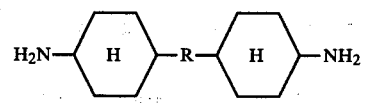

wherein R is a straight or branched alkylene group having 1 to 5 carbon atoms.

The fluoroelastomer composition of the present invention does not cause scorching as seen in a fluoroelastomer composition containing a conventional curing agent such as hexamethylenediamine carbamate or 4,4'-methylenebis(cyclohexylamine) carbamate. Even if stored at a high temperature and high humidity, the composition of the invention exhibits a sufficient scorching resistance, unlike a fluoroelastomer composition containing a conventional curing agent such as hydrofluoric acid salt of hexamethylenediamine. Further, sticking or staining of the mold does not occur, and the obtained cured rubber has properties which can stand comparison with those of conventional ones.

DETAILED DESCRIPTION

The present invention is applicable to a wide range of fluoroelastomers. For instance, copolymers of vinylidene fluoride with at least one kind of fluorine-containing olefins such as hexafluoropropene, pentafluoropropene, trifluoroethylene, trifluorochloroethylene, tetrafluoroethylene, vinyl fluoride, perfluoro(methyl vinyl ether) and perfluoro(propyl vinyl ether) can be employed in the present invention. Preferable polymers are vinylidene fluoride/hexafluoropropane copolymers and vinylidene fluoride/hexafluoropropene/tetrafluoroethylene terpolymers. Of particular interest are the copolymers of vinylidene fluoride and hexafluoropropene in a molar ratio of 92:8 to 55:45 and the terpolymers of vinylidene fluoride, hexafluoropropene and tetrafluoroethylene wherein the respective monomer units are present within the area formed on a triangular graph by connecting four points of the following molar ratios of vinylidene fluoride, hexafluoropropene and tetrafluoroethylene: 86:9:5, 60:35:5, 28:42:30 and 54:16:30. Copolymers of the above-mentioned monomers and a small amount of a vinyl compound, an olefin compound, a diene compound or an α,β-ethylenically unsaturated carboxylic acid are also employed in the present invention.

Hydrofluoric acid salts of diamine compounds of the general formula (I):

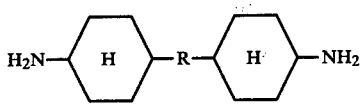

wherein R is a straight or branched alkylene group having 1 to 5 carbon atoms, are employed as curing agents in the present invention. The curing agents of the general formula (I) wherein R is

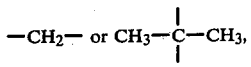

especially —CH$_2$— (i.e. methylene group), are preferably employed.

The above-mentioned specific curing agent is employed in an amount of 0.5 to 10 parts by weight, preferably 1 to 5 parts by weight, per 100 parts by weight of the fluoroelastomer. When the amount of the curing agent is less than the above range, curing is insufficient, and when the amount is more than the above range, the curing reaction tends to proceed to excess, thus resulting in loss of the elastomeric property.

Sufficient results can be obtained by compounding a fluoroelastomer with the above-mentioned curing agent and a conventional acid acceptor. Typical examples of the acid acceptor used in the present invention are oxides and hydroxides of bivalent metals such as magnesium, calcium, lead, zinc and barium, and metal salts of weak acids such as phosphates, carbonates, stearates and phosphites. The acid acceptor is employed usually in an amount of 2 to 30 parts by weight per 100 parts by weight of the fluoroelastomer.

The composition of the present invention may further contain, if necessary, a filler or reinforcing agent such as carbon black, silica, clay, diatomaceous earth or talc, a plasticizer, or a coloring agent. Also, one or more kinds of known curing agents may be employed in a small quantity.

The fluoroelastomer composition can be cured in a conventional manner. For instance, after milling the composition by mixing rolls, the composition is put into a mold and cured under pressure. The press-cured product is then cured in an oven. In general, the press cure is carried out at a temperature of 100° to 200° C. under a pressure of 20 to 100 kg./cm.$^2$G for 10 to 180 minutes. The oven cure is carried out at a temperature of 150° to 300° C. for 0 to 30 hours.

The cured rubber obtained from the composition of the invention has excellent heat resistance, low-temperature resistance and chemical resistance as obtained from a fluoroelastomer composition using a conventional curing agent. Moreover, the composition of the invention has an excellent scorching resistance which cannot be obtained by the use of a conventional curing agent. Accordingly, the industrial, economical value of the invention is very great.

The present invention will be more specifically described and explained by means of the following Examples and Comparative Examples, in which all parts are by weight unless otherwise noted. It is to be understood that the present invention is not limited to the Examples and various changes and modifications may be made in the invention without departing from the spirit and scope thereof.

EXAMPLES 1 TO 4 AND COMPARATIVE EXAMPLES 1 AND 2

To 100 parts of a terpolymer of 65.5% by mole of vinylidene fluoride, 17.5% by mole of hexafluoropropene and 17.0% by mole of tetrafluoroethylene (intrinsic viscosity η: 0.85 at 35° C. in tetrahydrofuran) were added a curing agent, medium thermal carbon and dibasic lead phosphite in that order according to the formulations shown in Table 1, while milling by mixing rolls at room temperature. The obtained compound was allowed to stand over night for aging. After milling again, the composition was put into a mold and cured at 170° C. under a pressure of 35 kg./cm.$^2$G for 10 minutes to give a sheet. The sheet was taken out from the mold and was then cured at 210° C. for 22 hours in an oven to give a cured rubber sheet.

With respect to the thus obtained cured rubber sheet, modulus at 100% elongation, tensile strength, elongation and hardness were measured according to Japanese Industrial Standard K 6301.

Also, the curing test of the composition was carried out at 170° C. by using a Curelastometer (JSR-Curelastometer II Type made by Japan Synthetic Rubber Co., Ltd.), and from the obtained curing curve, minimum viscosity, extent of cure, induction time, proper curing time and cure rate were obtained.

Further, the flow test was carried out in order to estimate the scorching resistance of the fluoroelastomer composition by using a Koka type flow tester (made by Shimadzu Corporation) having a nozzle of 1 mm. in length and 1 mm. in diameter. With respect to the fluoroelastomer composition obtained just after milling and aging [hereinafter referred to as "composition (A)"] and the fluoroelastomer composition which was allowed to stand at 40° C. under a saturated water vapor pressure for 3 days [hereinafter referred to as "composition (B)"], after predetermined pre-heating for 30 seconds the flow rate (cm.$^3$/min.) was measured under the conditions of pressure 70 kg./cm.$^2$ and temperature 170° C., and the scorching resistance was estimated from the result thereof.

The results are shown in Table 1.

TABLE I

|  | Ex. 1 | Ex. 2 | Ex. 3 | Ex. 4 | Com. Ex. 1 | Com. Ex. 2 |
|---|---|---|---|---|---|---|
| Fluoroelastomer composition (parts) | | | | | | |
| Fluoroelastomer | 100 | 100 | 100 | 100 | 100 | 100 |
| Medium thermal carbon | 20 | 20 | 20 | 20 | 20 | 20 |
| Dibasic lead phosphite | 15 | 15 | 15 | 15 | 15 | 15 |
| Hydrofluoric acid salt of 4,4'-methylenebis(cyclohexylamine) | 1.7 | 1.9 | 2.1 | 2.3 | — | — |
| 4,4'-Methylenebis(cyclohexylamine) carbamate) | — | — | — | — | 1.7 | 2.1 |
| Curing reactivity (Curing test) | | | | | | |
| Temperature (°C.) | 170 | 170 | 170 | 170 | 170 | 170 |

TABLE I-continued

|  | Ex. 1 | Ex. 2 | Ex. 3 | Ex. 4 | Com. Ex. 1 | Com. Ex. 2 |
|---|---|---|---|---|---|---|
| Minimum viscosity (kg.) | 0.35 | 0.35 | 0.34 | 0.31 | 0.34 | 0.31 |
| Extent of cure (kg.) | 3.34 | 3.58 | 3.80 | 4.1 | 3.76 | 4.30 |
| Induction time (min.) | 2.1 | 1.7 | 1.6 | 1.5 | 1.7 | 1.5 |
| Proper curing time (min.) | 6.4 | 5.5 | 4.8 | 4.6 | 6.3 | 5.1 |
| Cure rate (min.) | 4.3 | 3.8 | 3.2 | 3.1 | 4.6 | 3.6 |
| Properties of cured rubber |  |  |  |  |  |  |
| Modulus at 100% elongation (kg./cm.$^2$) | 22 | 25 | 27 | 30 | 25 | 32 |
| Tensile strength (kg./cm.$^2$) | 140 | 162 | 156 | 157 | 160 | 165 |
| Elongation (%) | 300 | 310 | 270 | 250 | 320 | 280 |
| Hardness | 73 | 72 | 75 | 75 | 72 | 74 |
| Scorching resistance (flow test) Flow rate (cm.$^3$/min.) |  |  |  |  |  |  |
| Composition (A) | 2.100 | — | 2.025 | 2.550 | 1.750 | 1.800 |
| Composition (B) | 2.550 | — | 2.050 | 1.950 | 0.415 | 0.200 |

(Notes)
1. Induction time indicates the time (minute) required in reaching 10% of the extent of cure, i.e. [(maximum viscosity) − (minimum viscosity)].
2. Proper curing time indicates the time (minute) required in reaching 90% of the above-mentioned extent of cure.
3. Cure rate indicates the difference between the proper curing time (minute) and the induction time (minute).

It would be understood from Table 1 that the curing reactivity of the fluoroelastomer composition of the invention containing hydrofluoric acid salt of 4,4'-methylenebis(cyclohexylamine) and the properties of the cured rubber obtained therefrom stand comparison with the case using a conventional curing agent, 4,4'-methylenebis(cyclohexylamine) carbamate. It would also be understood that even if the composition of the invention is stored under a severe condition, namely at 40° C. under saturated water vapor pressure, lowering of the flow rate is not observed, thus the composition has an excellent scorching resistance, as compared with the case using a conventional curing agent, 4,4'-methylenebis(cyclohexylamine) carbamate.

In addition to the ingredients used in the Examples, other ingredients can be used in the Examples as set forth in the specification to obtain substantially the same results.

What we claim is:

1. In a fluoroelastomer composition comprising a fluoroelastomer, an acid acceptor and a curing agent, the improvement which comprises employing as a curing agent a hydrofluoric acid salt of a diamine compound of the general formula:

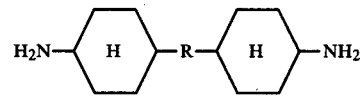

wherein R is a straight or branched alkylene group having 1 to 5 carbon atoms.

2. The composition of claim 1, wherein said curing agent is present in an amount of 0.5 to 10 parts by weight per 100 parts by weight of the fluoroelastomer.

3. The composition of claim 1, wherein said diamine compound is bis(4-aminocyclohexyl)methane.

4. The composition of claim 1, wherein said diamine compound is 2,2-bis(4-aminocyclohexyl)propane.

* * * * *